United States Patent
Cowelchuk et al.

(10) Patent No.: US 7,070,120 B2
(45) Date of Patent: Jul. 4, 2006

(54) ROTATING SPRAY HEAD FOR SPRAY URETHANE

(75) Inventors: Glenn Cowelchuk, Chesterfield, MI (US); Andrew P. Mellentine, Owosso, MI (US); Joe T. Donatti, Howell, MI (US); Robert Adams, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 230 days.

(21) Appl. No.: 10/744,278

(22) Filed: Dec. 23, 2003

(65) Prior Publication Data

US 2005/0133610 A1    Jun. 23, 2005

(51) Int. Cl.
*A62C 5/02* (2006.01)
*B05B 17/04* (2006.01)
*B05B 1/28* (2006.01)

(52) U.S. Cl. .............. 239/11; 239/8; 239/290; 239/293; 239/398; 239/452

(58) Field of Classification Search ............ 239/11, 239/8, 9, 10, 290, 293, 301, 381, 398, 452
See application file for complete search history.

(56) References Cited

U.S. PATENT DOCUMENTS

| | | | |
|---|---|---|---|
| 3,717,306 A | 2/1973 | Hushon et al. | |
| 3,795,364 A | 3/1974 | Kattner | |
| 3,873,023 A * | 3/1975 | Moss et al. | 239/3 |
| 3,927,162 A | 12/1975 | Stalter, Sr. | |
| 4,401,271 A | 8/1983 | Hansen | |
| 4,494,698 A | 1/1985 | Brown et al. | |
| 4,927,081 A * | 5/1990 | Kwok et al. | 239/223 |
| 5,028,006 A | 7/1991 | De Winter et al. | |
| 5,071,683 A | 12/1991 | Verwilst et al. | |
| 5,452,856 A | 9/1995 | Pritchard | |
| 5,704,825 A | 1/1998 | LeCompte | |
| 6,375,096 B1 | 4/2002 | Rashidi | |
| 6,572,031 B1 | 6/2003 | Hunter et al. | |
| 2002/0153433 A1 | 10/2002 | Hunter | |
| 2002/0170982 A1 | 11/2002 | Hunter | |
| 2003/0019952 A1 | 1/2003 | Hunter et al. | |
| 2003/0019953 A1 | 1/2003 | Hunter et al. | |

* cited by examiner

*Primary Examiner*—Davis Hwu
(74) *Attorney, Agent, or Firm*—Brooks Kushman P.C.

(57) ABSTRACT

A system and method for spray application of polyurethane used to spray form an article is disclosed. A spray nozzle is rotated as the polyurethane composition is sprayed onto a mold surface to apply a swath of polyurethane to the mold surface. The spray nozzle may be of an internal mixing or external mixing type that is moved relative to a mold surface in a path to create a skin layer with multiple partially overlapping swaths being applied in multiple passes. A motor and gear drive are used to rotate the nozzle tip and associated structure.

5 Claims, 3 Drawing Sheets

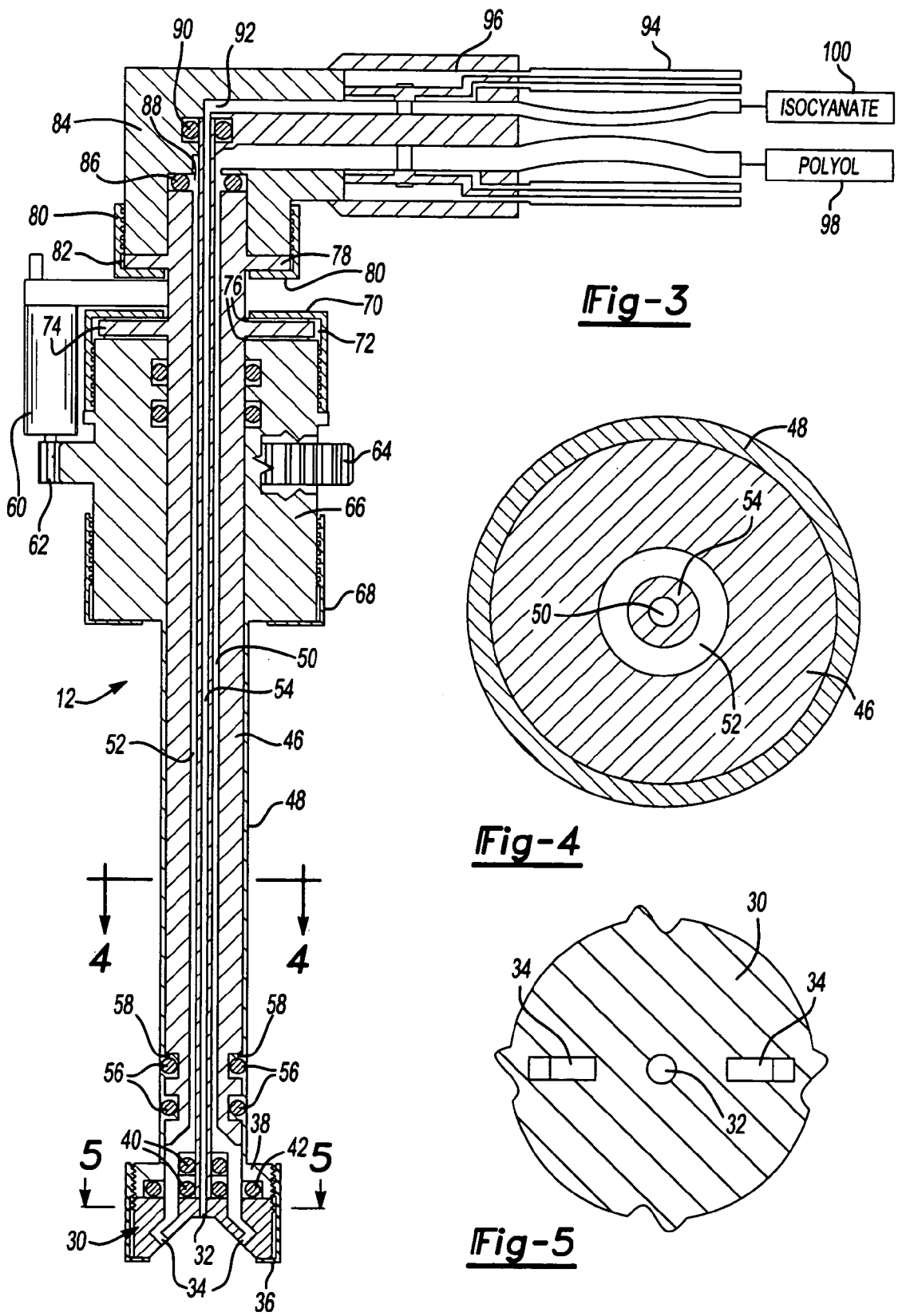

ROTATING SPRAY HEAD FOR SPRAY URETHANE

BACKGROUND OF THE INVENTION

1. Field of the Invention

The present invention relates to spray forming polyurethane articles using a rotating spray nozzle.

2. Background Art

Spray forming articles with polyurethane elastomer is a relatively new process that holds much promise for manufacturing high quality, durable parts. Parts that may be made with the polyurethane spray forming process include automotive interior parts as well as other parts. Some automotive interior parts that may be made using a polyurethane skin or a shaped polyurethane layer include instrument panel covers, console covers, inner door panels, glove box covers, floor mats, steering column covers, and knee bolsters, and the like.

Earlier attempts to manufacture polyurethane parts by a spray forming process have required expensive spray nozzle tips that are used to form a conical spray pattern. These elaborate spray nozzle tips, in addition to being expensive, require frequent maintenance and cleaning to assure proper performance. A conical spray pattern yields a slightly cupped spray deposit in cross-section with a portion near the outer edges of the spray deposit being thicker than the central portion.

In a previously filed application, applicants' assignee disclosed a method for spray application of polyurethane to form an article that includes supplying a polyurethane composition to a spray nozzle that sprays the polyurethane composition in a flat fan-shaped pattern onto a mold surface. A swath of polyurethane is applied to the mold surface as the nozzle and mold surface are moved relative to each other in a predetermined path. A skin is created by partially overlapping swaths that are applied in multiple passes of the nozzle relative to the mold. The skin layer formed has a more consistent thickness due to the flat fan-shaped spray pattern in comparison to prior art methods that employ conical spray patterns.

Even with the improvements associated with applicants' prior proposed system, the fan shaped pattern can be irregular and sensitive to the orientation of the robot arm while spraying. There is a continuing need to minimize imperfections in the sprayed coating layer and speed of application. By increasing the rate of material deposition, process cycle times can be reduced. Another aspect of the urethane spray forming process to be improved is to increase control of the spray application in undercut areas of a mold and in highly contoured areas. It would also be advantageous to reduce the difficulty of programming the robot that is used to spray the polyurethane. Finally, it would be advantageous to make the system more robust and error tolerant. To the extent that the positioning of the robot arm can be made less critical, design constraints can be broadened making more parts suitable for urethane spray forming.

SUMMARY OF THE INVENTION

One aspect of the present invention relates to a method for spray application of polyurethane for spray forming an article. The method comprises supplying a polyurethane composition to a spray nozzle and rotating the spray nozzle as the polyurethane composition is being sprayed onto a mold surface. The nozzle and mold surface are moved relative to each other in a path to create a skin layer with partially overlapping swaths being applied in multiple passes of the nozzle relative to the mold. A skin layer is formed by the method that has a substantially constant thickness.

According to other aspects of the invention as they relate to this method, the polyurethane composition may be supplied to the spray nozzle in two separate streams that are mixed after the composition is sprayed from the nozzle. Alternatively, the method may relate to the polyurethane composition being supplied to the spray nozzle in two separate streams that are mixed in the nozzle before the composition is sprayed. The rotating step may be performed intermittently as the polyurethane composition is being sprayed onto the mold surface. The nozzle, in one embodiment, is moved by a robot during the spraying step. The polyurethane composition may be a two component aromatic polyurethane mixture of polyol and isocyanate that are internally mixed in the spray applicator. The spray applicator may have a helical mixing element that mixes the polyol and isocyanate prior to being sprayed by the spray nozzle.

Another aspect of the invention relates to a system for forming a polyurethane layer on a surface comprises a spray gun for spraying a liquid reaction mixture comprising polyol and isocyanate in the form of a fan shaped spray pattern onto a mold surface to apply a swath of mixture to the mold surface. A motor and drive apparatus are connected to the spray gun to rotate the spray gun as it sprays the mixture. The spray gun is moved relative to the mold surface in a path to cover the mold surface whereby a layer is formed that has a relatively constant thickness.

Other aspects of the invention as they relate to the system comprise the motor being either an electric motor or an pneumatic motor. The drive apparatus may comprise a drive gear connected to the motor and a driven gear connected to the spray gun. The drive apparatus may alternatively comprise a drive gear connected to the motor and a driven gear connected to the spray gun wherein the drive gear and driven gear are interconnected by a chain. Alternatively, the drive apparatus may comprise a drive wheel connected to the motor and cylindrical surface associated with the spray gun.

BRIEF DESCRIPTION OF THE DRAWINGS

FIG. 3 is a cross sectional view of a rotating external mix spray gun;

FIG. 4 is a cross sectional view taken along the line 4—4 in FIG. 3;

FIG. 5 is a cross sectional view taken along the line 5—5 in FIG. 3;

DETAILED DESCRIPTION OF THE PREFERRED EMBODIMENT(S)

Figure 1:
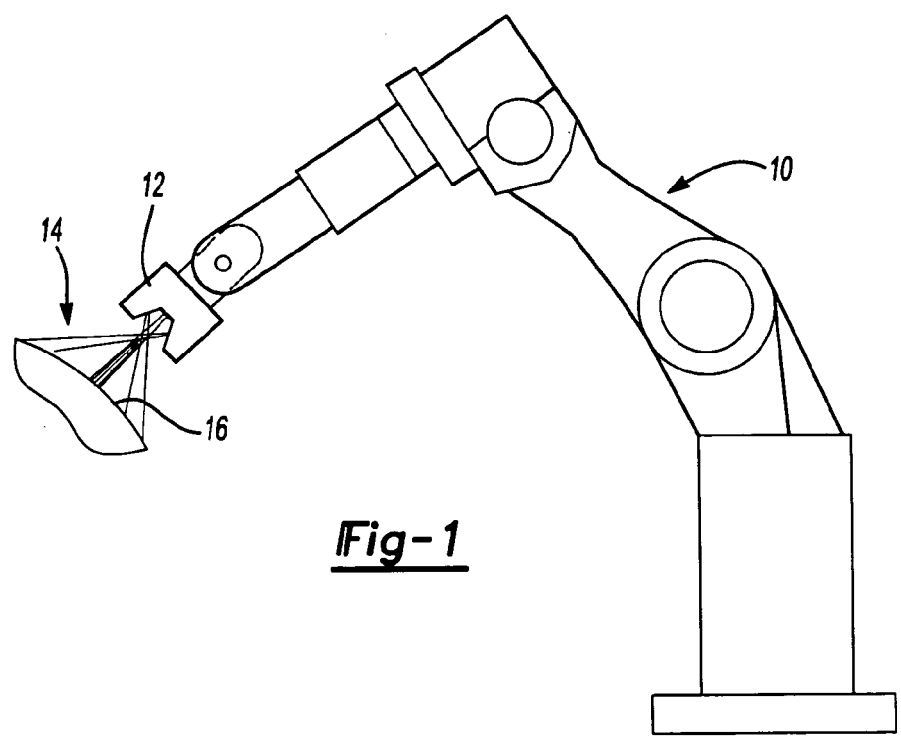
FIG. 1 is an elevation view of a robot having an external mix polyurethane spray gun made according to one embodiment of the present invention.

Referring to FIG. 1, a robot 10 having an external mix spray gun 12 is illustrated. The spray gun sprays a polyurethane material in a spray pattern 14 onto a mold surface 16.

Figure 2:
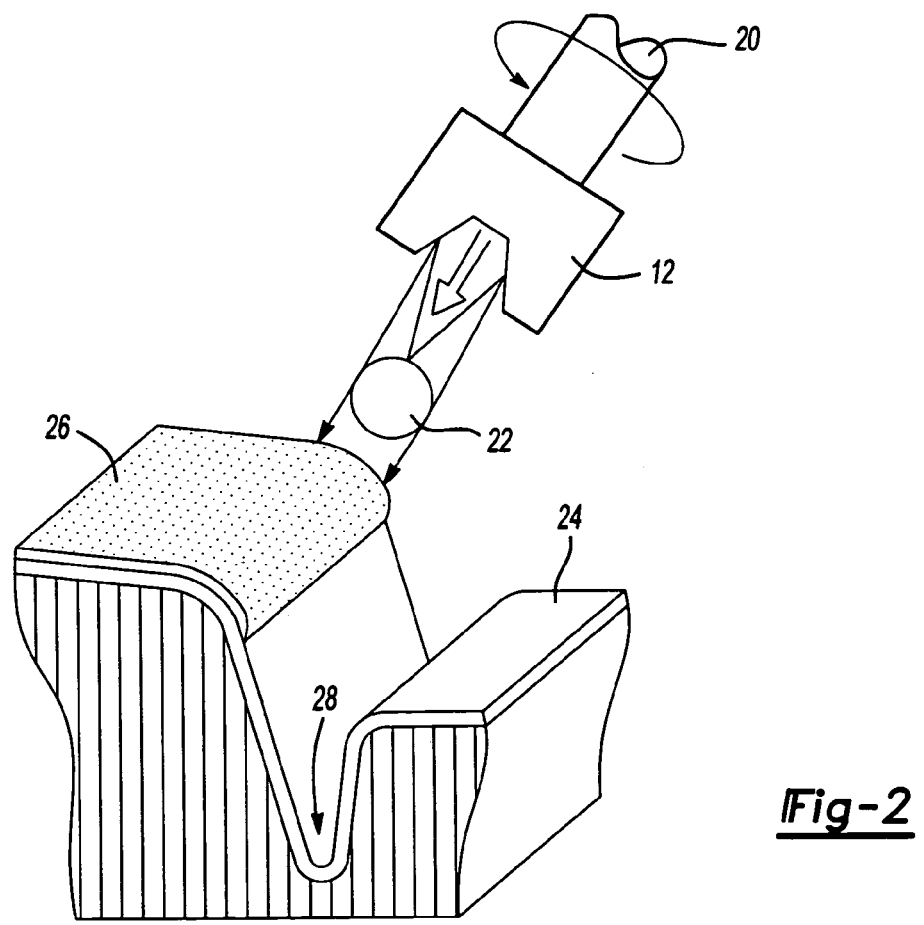
FIG. 2 is a fragmentary perspective view of an external mix polyurethane spray gun spraying polyurethane over an in-mold coating in a forming die.

Referring to FIG. 2, a spray gun 12 of the external mix type, is attached to a rotating support structure 20 indicated by the circular arrow adjacent the supporting structure 20. Constituents of the polyurethane mixture are combined in a mixing area 22 illustrated as a circular area in FIG. 2. It should be understood that the mixing area may take various shapes and configurations as a result of the high velocity flow of the atomized particles. The polyurethane is sprayed over an in-mold coating 24 to form a polyurethane skin 26 in multiple passes to provide a polyurethane skin having uniform thickness. A recess 28 is an example of an area of a mold that is difficult to apply a spray coating with prior art spraying systems. The rotating spray gun facilitates forming polyurethane skins in areas that are difficult to access such as the recess 28. The rotating spray gun 12 provides a generally circular spray pattern that is more evenly distributed as a result of the rotation of the spray gun.

Referring to FIGS. 3, 4 and 5, a spray gun 12 of the external mix type having an external spray tip nozzle 30 is shown in greater detail. The external spray tip nozzle 30 has a central spray port 32 and two inwardly directed spray ports 34. The spray tip nozzle 30 is secured by a retainer cap 36 to a circular head portion 38. An inner double seal ring 40 functions as a support and a seal between the spray tip nozzle 30 and head 38. An outer ring seal 42 forms a seal between the spray tip nozzle 30 and head portion 38. A wand 46 is enclosed by a rotatable sleeve 48. A first fluid flow channel 50 is formed in the center of the wand 46. A second fluid flow channel 52 is defined around the periphery of the central tube 54 that defines the first fluid flow channel 50.

Bearing rings 56 are provided between the wand 46 and sleeve 48 to provide a bearing surface as the wand 46 rotates within the sleeve 48. The grooves 58 that receive the rings 56 could be formed in either the wand 46 or sleeve 48.

A motor 60 is provided for rotating the spray gun 12. The motor 60 may be either pneumatic or electric. The motor 60 is operative to rotate drive gear 62 causing driven gear 64 that is associated with or secured to body 66 that may be formed as part of the sleeve 48.

A housing cap 68 and housing base 70 are secured to opposite ends of the body 66. An annular gap 72 is provided between the housing base 70 and body 66. A circular rib guide 74 is disposed in the annular gap 72. The body 66 and housing base 70 rotate relative to the circular rib guide 74 and wand 46 when the motor 60 rotates the drive gear 62 and driven gear 64.

A circular rib anchor 78 is retained by a gun body cap 80 in a space 82 defined between the gun body cap 80 and a gun body 84. A seal ring 86 is provided at the end of the wand 46 to seal between the end of the wand 46 and the gun body 84. An annular inlet 88 is defined by the gun body 84 through which polyol is supplied to the second fluid flow channel 52. A seal ring 90 is provided between the gun body 84 and central tube 54. A center inlet 92 is provided to direct isocyanate into the first fluid flow channel 50 is that defined in the center of the central tube 54. A hose 94 is connected by a quick connect 96 to the gun body 84. A source of polyol 98 and a source of isocyanate 100 are connected to the spray gun 12 by the hose 94 so that separate streams of isocyanate and polyol may be directed to the spray gun 12.

Figure 6:
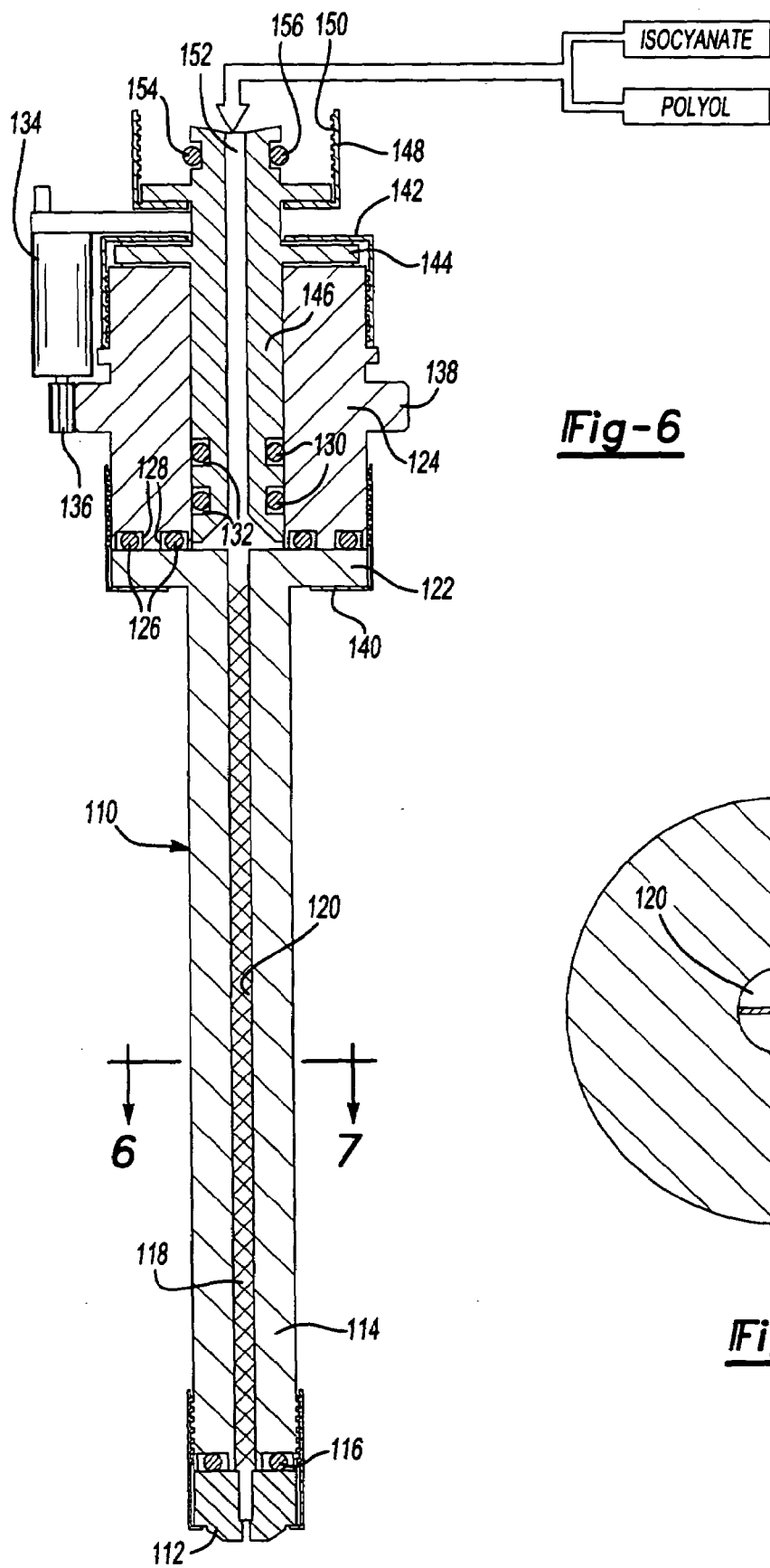
FIG. 6 is a cross sectional view of a rotating internal mix polyurethane spray gun.
Figure 7:
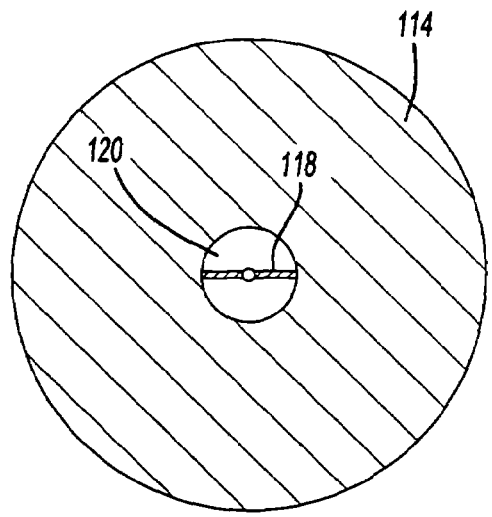
FIG. 7 is a cross sectional view taken along the line 7—7 in FIG. 6.

Referring to FIGS. 6 and 7, an internal mix rotating spray gun 110 comprising an alterative embodiment in the present invention is illustrated in detail. The internal mix rotating spray gun 110 has a fan spray nozzle tip 112 that is secured to the end of a mixing wand 114. A seal ring 116 seals between the nozzle tip 112 and mixing wand 114. A helical mixing element 118 is provided in a central bore 120 formed within the mixing wand 114. An annular base 122 of the mixing wand 114 is adapted to be connected to a body portion 124. Face seal rings 126 are provided in annular face grooves 128 to establish a seal between the annular base 122 and body portion 124. Shaft seal rings 130 are provided in radial grooves 132 to seal the interior of the body portion 124. A motor 134 is provided with a drive gear 136 that operatively engages a driven gear 138 that is associated with and connected to the body portion 124 so that the body portion 124 is rotated when the motor 134 is actuated. An end cap 140 secures the mixing wand 114 and annular base 122 to the body portion 124. A base cap 142 secures an annular rib 144 on a stationary shaft 146. The motor 134 rotates the body portion 124 and wand 114 relative to the stationary shaft 146.

A spray gun assembly cap 148 having a threaded inner diameter 150 is used to secure the spray gun 110 to a gun body (not shown) that may be a two component spray gun of conventional design. A polyurethane inlet 152 is provided in the center of the stationary shaft 146. Polyol and isocyanate are supplied through the polyurethane inlet 152. A seal ring 154 is received in a radial groove 156 to form a seal between the stationary shaft 146 and the two component spray gun.

FIG. 7 illustrates the structure of the mixing wand 114 and helical mixing element 118. The helical mixing element 118 is received within the bore 120 formed in the center of the mixing wand 114.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for forming a polyurethane layer on a surface, comprising:
   a spray gun for spraying a liquid reaction mixture comprising polyol and isocyanate, said mixture being sprayed in form of a flat fan shaped spray pattern onto a mold surface to apply a swath of the mixture to the mold surface;
   a motor;
   a drive gear connected to the motor and a driven gear connected to the spray gun that connect the motor to the spray gun to rotate the spray gun as it sprays the mixture; and
   moving the spray gun relative to the mold surface in a path to cover the mold surface, whereby a layer is formed that has a relatively consistent thickness.

2. The system of claim 1 wherein the motor is an electric motor.

3. The system of claim 1 wherein the motor is a pneumatic motor.

4. The system of claim 1 wherein the drive apparatus further comprises a drive gear connected to the motor and a driven gear connected to the spray gun, wherein a chain is driven by the drive gear to drive the driven gear.

5. The system of claim 1 wherein the drive apparatus further comprises a drive wheel connected to the motor and a cylindrical surface associated with the spray gun that is engaged by the drive wheel.

* * * * *